United States Patent [19]

Chinchen

[11] 4,177,252
[45] Dec. 4, 1979

[54] LOW TEMPERATURE SHIFT CONVERSION PROCESS

[75] Inventor: Godfrey C. Chinchen, Stockton-on-Tees, England

[73] Assignee: Imperial Chemical Industries Limited, London, England

[21] Appl. No.: 902,109

[22] Filed: May 2, 1978

[30] Foreign Application Priority Data

May 9, 1977 [GB] United Kingdom ............... 19379/77

[51] Int. Cl.$^2$ ............................ C01B 1/02; C01B 2/10
[52] U.S. Cl. ..................................... 423/656; 252/373
[58] Field of Search ................. 423/655, 656; 252/373

[56] References Cited

U.S. PATENT DOCUMENTS

| | | | |
|---|---|---|---|
| 3,303,001 | 2/1967 | Dienes | 423/656 |
| 3,546,140 | 12/1970 | Gutmann et al. | 423/656 X |
| 3,595,619 | 7/1971 | Slater et al. | 423/656 |
| 3,630,888 | 12/1971 | Alpert | 208/109 |
| 3,769,236 | 10/1973 | Allen et al. | 252/463 |
| 3,898,180 | 8/1975 | Crooks et al. | 252/449 |
| 3,922,337 | 11/1975 | Campbell et al. | 423/656 |
| 3,935,295 | 1/1976 | LaHue | 423/240 |
| 3,961,037 | 6/1976 | Davies et al. | 423/656 |
| 4,021,366 | 5/1977 | Robin et al. | 423/656 X |
| 4,142,988 | 3/1979 | Chinchen | 252/373 |

FOREIGN PATENT DOCUMENTS 2295117 7/1976 France.
1356996 6/1974 United Kingdom ...................... 423/240

*Primary Examiner*—Edward J. Meros
*Attorney, Agent, or Firm*—Cushman, Darby & Cushman

[57] ABSTRACT

The life of copper-containing catalysts in the low temperature shift reaction of carbon monoxide with steam is limited as a result of slow poisoning by halogen and/or sulphur compounds. It has been found that the poisoning reaction and the shift reaction occur almost entirely on the surface of the catalyst pellets, and that the rate at which a catalyst charge loses activity can be decreased by having the catalyst in an inlet zone in a form more accessible to the reacting gas than that catalyst downstream thereof. The inlet zone catalyst pieces can be smaller and/or formed with indentations or protrusions and/or more macroporous in order to provide better access.

10 Claims, 1 Drawing Figure

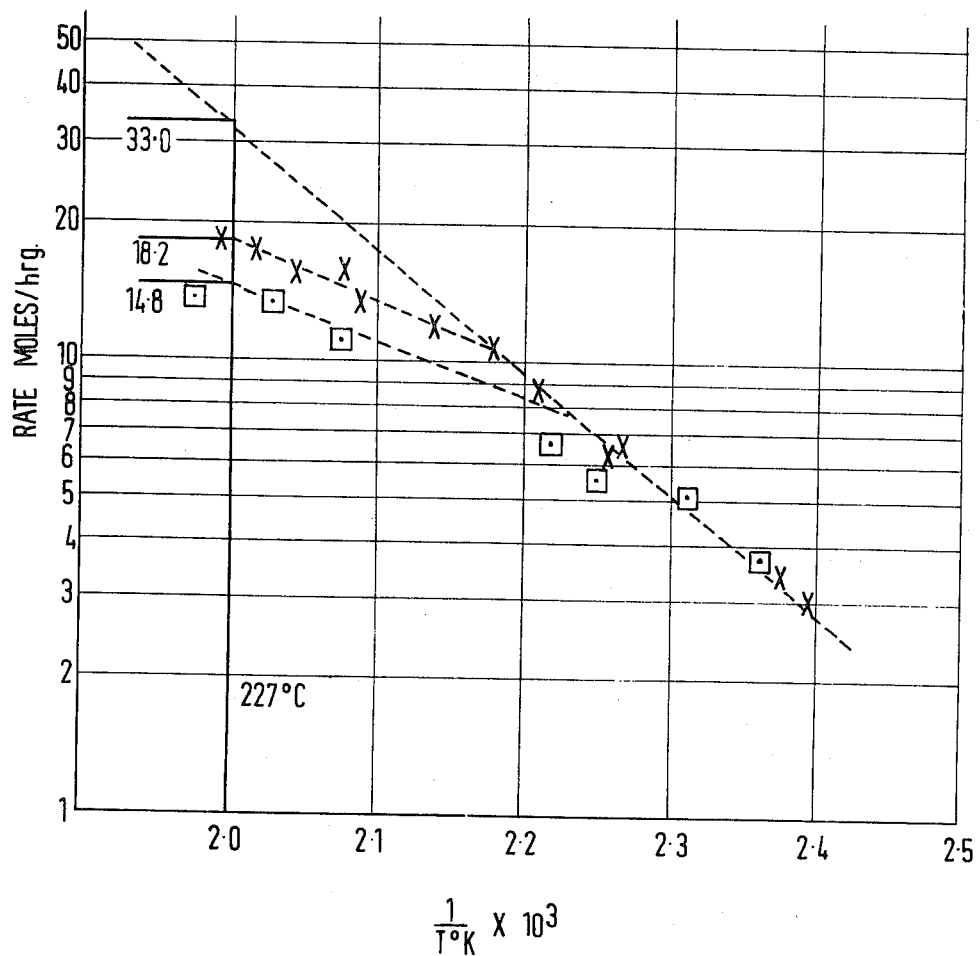

LOW TEMPERATURE SHIFT CONVERSION PROCESS

This invention relates to hydrogen and in particular to a process for producing it by reaction of carbon monoxide with steam over a copper-containing catalyst.

The "low temperature shift" reaction catalysed by metallic copper has been known as a matter of chemistry since the 1920's. It has been practised industrially since about 1963 in plants for producing ammonia synthesis gas or hydrogen, following successful researches aimed at removing the causes of gross defects in the copper catalysts and in the conditions of using such catalysts. Since then, the working life of copper-containing catalysts has on occasion been objectionably short, and this has been traced to poisoning by chloride in the gas passed over the catalyst and has been remedied by guarding the catalyst with a bed of material more basic than zinc oxide, as described in our UK Pat. No. 1,357,335. This remedy is, however, not entirely satisfactory in that, in the event of a plant mishap resulting in liquid water reaching the guard bed, alkali and chloride may be washed out of it and on to the shift catalyst.

We have found that a guard bed can be provided without introducing undesirable or non-catalytic material.

According to the invention carbon monoxide is reacted with steam to give carbon dioxide and hydrogen at an outlet temperature under 300° C. over a fixed bed copper-containing catalyst in two zones, the catalyst in the zone ("inlet zone") first encountered by the reactant gas being more accessible to the gas than the catalyst in a zone ("outlet zone") thereafter encountered by the gas.

Our invention is based on our observations that the chemical reaction by which chloride (which is present as hydrogen chloride) poisons the copper-containing catalyst is inherently very fast and that in catalytic operations the rate at which its reactants take part in it is limited by the rate at which chloride diffuses into the pores of the catalyst. We have observed also that the low temperture shift reaction is limited by such diffusion and that indeed both reactions take place almost entirely at the geometric surface of the catalyst pieces; thus by using the more accessible catalyst we have been able to increase the guarding (that is, poison-absorbing) capacity of the inlet zone of the catalyst without making its composition undesirably different or without introducing extraneous materials. Our invention is also effective in decreasing the effect of sulphur compounds in the process gas, the rate of poisoning by sulphur compounds being also strongly diffusion-limited.

It is of course known in a general way that the rate of a chemical reaction over a heterogeneous catalyst can be expected to be higher the more accessible the catalyst is to the reacting gas. This effect can be exploited by increasing the geometric area of the catalyst pieces, but the simplest way of doing this, namely by using smaller catalyst pieces, also increases the pressure-drop through the bed: consequently the catalyst sizes in common use represent a compromise between conflicting requirements. Further, if in order to increase reaction rate any zone of a catalyst bed were to be charged with smaller particles, it would be obvious to so charge the outlet zone, where the concentration of reactants is lowest. In our process it appears that the use of more accessible catalyst in the inlet zone does in fact afford a higher reaction rate since, even at the low temperature of the inlet zone, the rate is limited by the rate of diffusion in catalyst pores. In this respect the low temperature shift reaction differs from the high temperature shift reaction, a two-part catalyst bed for which is described in our UK Pat. No. 1,500,089.

Greater accessibility in the inlet zone can be attained in a number of ways. In the simplest way the inlet zone catalyst is present in pieces of about the same shape as but smaller in size than those of the outlet zone. Suitably the catalyst pieces have each of their dimensions in the range 2.5 to 3.5 mm in the inlet zone and 3.5 to 7.0 mm in the outlet zone, for example the inlet zone catalyst is in the form of ⅛ inch (3.2 mm) cylinders and the outlet zone in the form of 3.6×5.4 mm squat cylinders. The geometric volume per unit geometric surface of the smaller pieces is 0.69 times that of the pieces in the outlet zone. (The volume to surface ratio is quoted in preference to the surface to volume ratio in accord with the mathematical analysis of diffusion as set out below).

In other ways, accessibility of the gas to the catalyst can be made greater by using pieces of lower density and greater pore volume, or using pieces whose shape affords a geometric surface that is greater at substantially the same over-all size or even at a greater over-all size. These ways are preferred when it is necessary to avoid increasing the pressure-drop through the catalyst bed, such as would occur if the above-mentioned smaller pieces were used. Of course, several ways can be used in combination. As examples of such pieces there may be mentioned granules made by wet-granulation and shapes made by extrusion, whose density is lower and macro-pore volume greater than that of compressed pellets commonly used in the shift process. If the pieces are made by extrusion they can have an especially high geometric surface, since non-cylindrical extrudates having, for example, a lobed cross-section can by made.

Preferably the inlet zone catalyst pieces comprise pellets in the general form of a cylinder having at least one indentation or protrusion in or on one or each of its end surfaces, as described and claimed in our UK Pat. No. 1,323,064. Such pellets can be made using compression-pelleting machines similar to those used for making the plane-ended cylindrical pellets commonly used but modified by the provision of suitably profiled punches. Using a catalyst as described in FIG. 3 of U.K. Pat. No. 1,323,064 for the inlet zone it is possible to increase the external surface per unit catalyst bed volume by 25% while decreasing the pressure drop by 19%, and thus to increase the external surface very substantially if the pressure drop is not decreased or if some increase in pressure drop can be allowed.

For a process of wide usefulness the volume to surface ratio of the inlet zone catalyst pieces is at most 80% and preferably 30–70% of that of the outlet zone pieces. If desired, the inlet zone catalyst can be of the type having a layer of active material, for example of copper or zinc oxide/copper or zinc oxide/copper/alumina, on the geometric surface of a shaped support such as alumina or spinel.

The process preferably employs an inlet catalyst zone having a volume less than that of the rest of the catalyst. Suitably the inlet zone is 10–30% v/v of the total catalyst. The inlet zone can be in a separate reactor or in a distinct compartment of the same reactor as the rest of the catalyst. Most conveniently the inlet zone catalyst pieces lie on the rest of the catalyst constituting the outlet zone; thus only one catalyst bed is used with downward gas flow. In this arrangement there is not much weight of catalyst above any part of the inlet zone catalyst and accordingly catalyst shapes that would normally be considered to be mechanically too weak (for example extrusions, rings under 6 mm in diameter and some types of indented pellet) can be used in the inlet zone.

The process of the invention can be used in conjunction with other measures for removing halogen from gas to be reacted over a shift catalyst. If a halogen guard bed containing an alkali metal compound is used, it is preferably in a vessel separated from the shift reactor by a catchpot, in order to prevent dissolved alkali and chloride from reaching the shift catalyst. If the shift bed follows a carbon dioxide removal stage, the alkaline liquors used in that stage will normally remove halogen compounds from the gas, but the shift process of the invention is still valuable as an insurance against accidental poisoning.

The halogen content of the gas to be reacted in the process is typically in the range $10^{-4}$ to $10^{-2}$ ppm v/v as hydrogen halide. It is believed, however, that the presence of halogen is often intermittent or accidental, and therefore that the process is advantageous as an insurance even when halogen contamination is not expected. The above range therefore is an average over the life of a catalyst charge.

The copper-containing shift catalyst usually contains various oxides acting as catalyst supports and possibly also having themselves a catalytic action. Most commonly the catalyst contains zinc oxide, usually with a zinc to copper atomic ratio in the range 0.3 to 5, especially 1 to 2.5. For greater catalytic stability the catalyst also contains one or more other difficulty reducible oxides such as those of magnesium, aluminium, titanium, zirconium, vanadium, chromium or manganese suitably in a concentration of 2–40, especially 4–20, % by metal atoms. Other catalysts containing copper with aluminium and/or chromium and/or manganese but without zinc have been proposed for the low temperature shift reation. The co-precipitated catalysts containing zinc oxide and alumina described and claimed in our UK Pat. No. 1,131,631 are especially suitable for the process of the invention. In view of the higher activity due to the higher accessibility of the inlet zone catalyst, its copper content can be lower than (for example 40–80% w/w of) that of the outlet zone catalyst. Such a lower copper content can be arrived at suitably by adjustment of the zinc to copper ratio or by increasing the content of the said other oxides.

Low temperature shift catalysts are usually formulated to contain as little alkali metal compound as possible and certainly less than 0.25% w/w calculated as equivalent $Na_2O$, since alkali metal compounds cause a die-off of catalytic activity. Such a low alkali content is preferred for the inlet zone catalyst as well as for the rest of the bed. If such die-off is acceptable in the inlet zone, however, its alkali content can be higher, for example up to 0.5% w/w calculated as equivalent $Na_2O$. The allowable content of alkali depends on the chemical composition of the catalyst, since this affects the ease with which alkali metal chlorides are washed out by liquid water.

Within the broad outlet temperature range disclosed, the process is preferably operated in the range 180–270° C. The inlet temperature is preferably not under 180° C. and the outlet temperature not over 270° C. The catalyst zones can be cooled by internal heat exchange tubes if desired but, as in the majority of industrial low temperature shift processes, is suitably adiabatic. The inlet carbon monoxide concentration is suitably in the range 0.5 to 10.0, especially 1.0 to 5.0% v/v on a dry basis and the steam to carbon monoxide molar ratio is suitably in the range 3–300, especially 10–50. The pressure is suitably over 10, especially in the range 15–40 atm. abs. The combination of temperature, steam content and pressure are chosen, as in known low temperature shift processes, to be outside the conditions in which steam condenses.

EXPERIMENTAL AND THEORETICAL BASIS OF THE INVENTION

The dependence of the rate of a gas reaction of diffusion within the pores of a catalyst is usually expressed in terms of the "effectiveness factor," which is the quotient of the observed rate by the rate that would be observed if pore diffusion limitation were not present. For a first order reaction Thiele (Industrial and Engineering Chemistry 1939, 31(7), 916–920) showed that the ratio of the two rates depends on the dimensionless modulus $$h = x_s \sqrt{c/kr}$$

where
$x_s$ = some linear dimension fixing the catalyst pellet size;
k = coefficient of diffusion of reactants in the gas phase;
r = average area of pore cross-section per unit length of perimeter of pore cross section (hydraulic ratio of pores);
c = activity of the pore surface.

Haynes (Chemical Engineering Science 1970, 25, 1615–1619) showed that the concentration of poison in the various parts of a catalyst bed is distributed according to a profile, the shape of which is flatter the higher the value of h. From the experiments reported below it became apparent that both the low temperature shift reaction and the poisoning by chloride have an h value of at least 20 and probably in the range 100–300 when the catalyst is in the form of 3.6×5.4 squat cylindrical pellets, as it typically is.

The effect of the inlet zone of more accessible copper-containing material can be evaluated by way of example by considering the effect of pellet size in the value of h. When h is high its magnitude is proportional approximately to the ratio of the geometrical volume of the catalyst pellets to their external surface area. The experiments described below show h as about 230 for a typical commercially available low temperature shift catalyst when in the form of 3.6×5.4 mm squat cylindrical compressed pellets. Values of h for pellets affording more accessibility are shown in Table 1.

TABLE 1

| Pellet size (mm) and shape | Volume/area, cm | h |
| --- | --- | --- |
| 3.6 × 5.4 squat cylindrical | 0.077 | 230 |
| 3.2 × 3.2 cylindrical | 0.053 | 158 |
| 3.6 × 5.4 squat cylindrical double-dimpled | 0.053 | 158 |

These values of h can be substituted in the Haynes equation $$F_A = \left[\frac{h\,\xi\coth h\,\xi - 1}{h(1-\xi)\coth h\,\xi + 1}\right]\left[\frac{1}{h\coth h - 1}\right]$$

where $F_A$ is the ratio of activity after poisoning to activity before poisoning $\xi$ is the reduced radius of the poison free zone and is related to the degree $\psi$ of coverage by poison by the expression $\psi = 1 - \xi^3$. Such substitution can produce a set of values of activity ratio $F_A$ for various degrees of coverage by poison. Table 2 shows such sets for the least and most accessible pellets shown in Table 1.

TABLE 2

Activity ratio $F_A$ for various degrees of coverage by poison

| | Degree of coverage $\psi$ | | | | | | | |
|---|---|---|---|---|---|---|---|---|
| h | 0 | 0.001 | 0.005 | 0.01 | 0.02 | 0.05 | 0.10 | 0.15 |
| 230 | 1.0 | 0.93 | 0.72 | 0.56 | 0.39 | 0.20 | 0.11 | NA |
| 158 | 1.0 | 0.95 | 0.80 | 0.66 | 0.49 | 0.28 | 0.16 | 0.11 |

It is evident that a decrease in activity to 11% of its level before poisoning results from 10% coverage of the pellets having h=230, but from a 15% coverage of the pellets having h=158. Thus the effect of using the more accessible pellets is threefold:

(a) activity is greater because the diffusion-limitation of the shift reaction is less, whether poisoning has occurred or not;

(b) more poison is adsorbed, owing to the greater adsorptive area, and therefore poisoning of the downstream parts of the catalyst bed is delayed; and (c) the period during which the inlet portion of the bed remains catalytically active is lengthened because a larger coverage of poison is needed to deactivate it.

The experimental basis for our invention is as follows:

1. Testing the Shift Reaction for Diffusion Limitation.

(a) A commercial low temperature shift catalyst (CuO-ZnO-Al$_2$O$_3$, 34:54:12 w/w) in the form of 3.6×5.4mm squat cylindrical compressed pellets was crushed and sieved to 5 smaller size fractions. Equal bulk volumes (25 ml) of these fractions were reduced to active catalyst by means of diluted hydrogen with very careful temperature control and then used to catalyse the shift reaction in the following conditions

| | |
|---|---|
| Dry gas composition % v/v | CO 5; CO$_2$ 15; H$_2$ 80 |
| Steam to dry gas ratio v/v | 0.5 |
| Dry gas space velocity | 12000 hour$^{-1}$ |
| Temperature | 230° C. |
| Pressure | 1 atm. abs. |

The outlet gas was analysed and the results expressed as a first order velocity constant for the disappearance of carbon monoxide. Table 3 shows the velocity constants for each fraction and for uncrushed pellets. Since the reaction rate using the smallest particles is greater than using the next smallest, it is evident that the reaction over the smallest particles is still subject to diffusion-limitation, that is, has an effectiveness factor of less than unity. However, if the smallest particles are taken to be diffusion-free, for purposes of comparison, Table 1 shows the maximum relative effectiveness factor for each particle size fraction.

TABLE 3

| BSS Sieve range | — | ¼-4 | 5-6 | 10-12 | 18-22 | 36-45 |
|---|---|---|---|---|---|---|
| Size range, mm | uncrushed | over 4.0 | 3.35 to 2.81 | 1.67 to 1.40 | 0.85 to 0.7 | 0.42 to 0.35 |
| Activity sec$^{-1}$ | 7.67 | 10.50 | 13.27 | 17.50 | 33 | 35 |
| Relative effectiveness factor | 0.22 | 0.30 | 0.38 | 0.50 | 0.94 | 1.0 |

(b) Other experiments were carried out using smaller particles (100-200 and 200-250 microns) over a range of temperature. The results were expressed as velocity constants, which were then plotted against reciprocal absolute temperature, as shown in the accompanying figure. The change in slope of the plots is indicative of pore diffusion limitation occurring still at temperatures of 180° C. and above, and an estimate of the effectiveness factor E for the particles can be obtained at 227° C. from the value of the diffusion-free velocity constant (33.0) determined by extrapolation. Thus 100-200 microns: $E = \frac{18.2}{33.0} = 0.552 = \frac{\tanh h}{h}$; $h = 1.56$ 200-250 microns: $E = \frac{14.8}{33.0} = 0.448 = \frac{\tanh h}{h}$; $h = 2.13$ Since h is proportional to volume/area, predictions of h for 5.4×3.6 mm pellets are h=41.5 or 43.8, giving effectiveness factors for 5.4×3.6 mm pellets at 227° C. and 1 atm pressure of 0.023-0.024.

Since h for a first order reaction is generally proportional to the square root of the pressure, the value of h for the shift catalyst as 5.4×3.6 mm pellets operating at 30 atm. will be 227-239.

2. Extent of Diffusion Limitation of Poisoning Reaction (a) A charge of the same low temperature shift catalyst was used in an ammonia plant until its activity, as shown by the carbon monoxide content of the outlet gas, had declined to the limit of acceptability. The charge was then cooled in nitrogen and superficially oxidised by passing very dilute oxygen through it. The following observations were made:

(i) appearance: the pellets at the inlet end were superficially reddish in colour owing to the formation of large crystals of metallic copper. By X-ray examination it was observed that chloride and sulphur were present almost exclusively on the pellet surface;

(ii) chloride content: the maximum chloride content in any part of the catalyst bed was 0.1% w/w;

(iii) residual activity: during plant operation the activity at various levels in the bed had been determined at intervals by measuring the temperature at these levels. The fraction of the bed having zero activity corresponded to a rate of poisoning of 6.5 cubic meters per year for a wet gas flow rate of 10$^5$ cubic meters per hour. The fraction of the bed having an activity between zero and full normal activity was 0.75 cubic meters on the same basis.

(b) Two separate runs under the same conditions as in the previous section were carried out using 3.6×5.4 mm squat cylindrical pellets for 700 hours, with measurements of the composition of the product gas at intervals and calculation of first order velocity constants. The results were analysed by the aid of the equations developed by Khang et al. (Industrial and Engineering Chemistry Fundamental, 1973, 12 (2), 185-190). From the previous experiment and from observation of behaviour of the catalyst during industrial use it was evident that the shift and poisoning reactions are both strongly diffusion-limited. Consequently Khang et al's. Case 4, in which h for the shift and $h_p$ for the poisoning reaction tend to infinity appears to be applicable and the rate of change of activity with time is given by $$-\frac{da}{dt} = K_d C_p \frac{a^3}{\frac{h_p}{h}(1-a) + a}$$

where
- $a$ = rate observed/rate using fresh catalyst
- $K_d$ = velocity constant of deactivation
- $C_p$ = concentration of poison in gas Integrating, rearranging and substituting $a = k/k_o$ (where $k_o$ is the initial velocity constant and $k$ the velocity constant after time $t$) we get $$t\left[\frac{k}{k_o - k}\right] = \frac{h_p}{h K_d C_p}\left[\frac{k_o - k}{2k}\right] + \frac{1}{K_d C_p}$$

Then, substituting $K = (k_o - k)/k$, a plot of $t/K$ against $K$ should yield a straight line of slope $h_p/2h\, K_d\, C_p$ and intercept $1/K_d\, C_p$.

Table 4 shows the slopes and intercepts (least squares fits) for the two runs and the values of $K_d\, C_p$ and $h_p/h$ calculated therefrom.

TABLE 4

| Run | Slope | Intercept | $K_d C_p$ | $\frac{h_p}{h}$ |
|---|---|---|---|---|
| (i) | $9.6 \times 10^2$ | $1.06 \times 10^3$ | $0.94 \times 10^{-3}$ | 1.81 |
| (ii) | $0.99 \times 10^3$ | $5.22 \times 10^2$ | $1.01 \times 10^{-3}$ | 1.05 |

It is thus evident that the Thiele modulus for the poisoning reaction is at least as great as for the shift reaction, and that increased accessibility of the catalyst at the inlet end of the bed will increase its capacity to absorb poisons and guard the downstream portion of the bed. The first order velocity constant $k_p$ for the poisoning reaction is estimated to be about 70 sec$^{-1}$, about 10 times greater than that of the shift reaction. These values of $h_p$ and $k_p$, when applied to the method of Haynes, with profiles for $h_p = 230$ determined by extrapolation, predict a poisoning rate of 0.94 m$^3$ per 1000 hours using 3.6×5.4 mm squat cylindrical pellets but only 0.68 m$^3$ per 1000 hours using 3.2×3.2 mm pellets, for a wet gas space velocity of $10^5$ hour$^{-1}$ at identical poison concentrations.

EXAMPLE (a) The low temperature shift recorder of a 1000 metric tons per day ammonia production plant was to be charged with oxide-form catalyst "52 - 1" having the weight percentage composition CuO 34; ZnO 54; Al$_2$O$_3$ 12 (Na$_2$O content 0.08%). The lower 47 m$^3$ of the reactor was charged with the catalyst in the form of 3.6×5.4 mm squat cylindrical compressed pellets. The upper 15 m$^3$ were then charged with catalyst of the same composition but in the form of 3.2×3.2 mm compressed cylindrical pellets. The charge was reduced with a hydrogen-nitrogen mixture, starting at 0.3% v/v of hydrogen and slowly increasing this to 10% and controlling the hydrogen content and inlet temperature to prevent any temperature rise above 250° C. Over the reduced catalyst was then passed at a dry gas space velocity of 2400 a process gas having the following dry basis volume percentage composition:

| | |
|---|---|
| CO | 2.5 |
| CO$_2$ | 15.4 |
| H$_2$ | 61.0 |
| N$_2$ + Ar | 20.7 |
| CH$_4$ | 0.4 | along with steam at a molar steam to gas ratio of 0.52. The pressure was 31.5 atm. abs. Initially the temperature was 204.5° C. at the inlet and 227° C. at the outlet and the outlet CO content was 0.15% v/v. According to the design of the process the inlet temperature was to be raised gradually during operation until at 2.5 years the inlet temperature would be 227° C., the outlet temperature 249° C. and the outlet CO content 0.3% v/v, at which time the catalyst would be replaced by a new charge: these values relate to a catalyst charge consisting entirely of 3.6×5.4 mm squat cylindrical pellets. Using the 2-part charge as described above, the increase in temperature needed in the first 6 months of operation was significantly less than in previous operations using only 3.6×5.4 mm catalyst and the life of the charge is now expected to be 3 years or longer. This behaviour is consistent with effective poison absorption by the small-pellet catalyst from a feed gas mixture containing an average between 10$^{-4}$ and 10$^{-2}$ ppm v/v of hydrogen halide. The pressure-drop of the 2-part charge was 12% greater than that of the same bed charged only with 3.6×5.4 mm pellets, but the geometric surface of the small pellets is 45% greater than that of the same volume of 3.6×5.4 mm pellets.

(b) In a similar reactor and plant the upper 15 m$^3$ of catalyst bed are charged with catalyst of the same composition in the form of 3.6×5.4 squat cylindrical pellets each having a smooth depression (curvature radius 1 mm in convex region, 2 mm in concave region) 1.2 mm deep in each of its flat ends. Such pellets each provide about 25% more geometric surface per units volume of material, but with substantially no increased pressure-drop. A significantly longer catalyst life is expected, as compared with a bed using only plane-ended pellets.

I claim:

1. A process for producing hydrogen and carbon dioxide according to a low temperature shift reaction, said process comprising contacting a gaseous mixture containing carbon monoxide and steam with a fixed-bed of a copper-containing catalyst, wherein:
   (a) said fixed-bed comprises an inlet zone where the reacting gas first encounters said catalyst and an outlet zone where gases subsequently encounter said catalyst;
   (b) the outlet temperature is less than about 300° C; and
   (c) the volume-to-surface area ratio of the catalyst pieces in the inlet zone is less than the volume-to-surface ratio of the catalyst pieces in the outlet zone, whereby the inlet zone catalyst absorbs poisoning compounds at high effectiveness and decreases poisoning of the outlet zone catalyst.

2. A process according to claim 1 in which the inlet zone catalyst is present in pieces about the same shape as but smaller in size than those in the outlet zone.

3. A process according to claim 1 in which the inlet zone catalyst pieces have a lower density and greater pore volume than those in the outlet zone.

4. A process according to claim 1 in which the inlet zone catalyst pieces comprise pellets in the general form of a cylinder having at least one indentation or protrusion in or on one or each of its end surfaces.

5. A process according to claim 1 in which the volume-to-surface ratio of the inlet zone catalyst pieces is in the range 30–70% of that of the outlet zone pieces.

6. A process according to claim 1 in which the volume of the inlet zone is 10–30% of the total catalyst bed volume.

7. A process according to claim 1 in which the catalyst is contained in a single outflow bed and the inlet zone catalyst pieces lie on the rest of the catalyst constituting the outlet zone.

8. A process according to claim 1 in which the halogen content of the reactant gas, averaged over the life of a catalyst charge, is in the range $10^{-4}$ to $10^{-2}$ ppm v/v as hydrogen halide.

9. A process according to claim 1 in which the copper content of the inlet zone catalyst is 40–80% of that of the outlet zone catalyst.

10. A process according to claim 1 in which the volume-to-surface ratio of the inlet zone catalyst pieces is at most 80% of that of the outlet zone pieces.

* * * * *